US012077180B2

United States Patent
Lienke et al.

(10) Patent No.: US 12,077,180 B2
(45) Date of Patent: Sep. 3, 2024

(54) CONTROL SYSTEM AND CONTROL METHOD FOR A HYBRID APPROACH FOR DETERMINING A POSSIBLE TRAJECTORY FOR A MOTOR VEHICLE

(71) Applicant: ZF Automotive Germany GmbH, Alfdorf (DE)

(72) Inventors: Christian Lienke, Gelsenkirchen (DE); Christian Wissing, Dortmund (DE); Manuel Schmidt, Dortmund (DE); Andreas Homann, Dortmund (DE); Torsten Bertram, Düsseldorf (DE); Till Nattermann, Krefeld (DE); Martin Keller, Waltrop (DE); Karl-Heinz Glander, Monheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 476 days.

(21) Appl. No.: 17/413,982

(22) PCT Filed: Dec. 16, 2019

(86) PCT No.: PCT/EP2019/085300
§ 371 (c)(1),
(2) Date: Jun. 15, 2021

(87) PCT Pub. No.: WO2020/127011
PCT Pub. Date: Jun. 25, 2020

(65) Prior Publication Data
US 2022/0032952 A1 Feb. 3, 2022

(30) Foreign Application Priority Data
Dec. 17, 2018 (DE) .......................... 102018009927.0

(51) Int. Cl.
*B60W 60/00* (2020.01)
*B60W 30/12* (2020.01)
(Continued)

(52) U.S. Cl.
CPC ........ *B60W 60/0011* (2020.02); *B60W 30/12* (2013.01); *B60W 30/18163* (2013.01);
(Continued)

(58) Field of Classification Search
None
See application file for complete search history.

(56) References Cited

U.S. PATENT DOCUMENTS

2012/0022739 A1* 1/2012 Zeng .................. B62D 1/28
348/148
2015/0353082 A1* 12/2015 Lee ..................... B60W 10/20
701/41
(Continued)

FOREIGN PATENT DOCUMENTS

DE 10132386 A1 1/2003
DE 102011081159 A1 2/2013
(Continued)

OTHER PUBLICATIONS

International Search Report and Written Opinion for PCT/EP2019/085300 mailed Mar. 23, 2020 (13 pages; with English translation).
(Continued)

*Primary Examiner* — Peter D Nolan
*Assistant Examiner* — Jacob Kent Besteman-Street
(74) *Attorney, Agent, or Firm* — ROSSI, KIMMS & McDOWELL LLP

(57) ABSTRACT

A control system for use in a motor vehicle and configured to monitor a current driving situation of the motor vehicle on the basis of surrounding data of the motor vehicle acquired
(Continued)

from at least one surrounding sensor arranged on the motor vehicle in a current driving situation is disclosed. The control system is configured to determine information relating to a current driving situation of the motor vehicle on the basis of the provided surrounding data, to determine information relating to a current driving situation of the motor vehicle and to determine a component of a future driving maneuver for the motor vehicle on the basis of the information relating to the current driving situation of the motor vehicle. Furthermore, the control system is configured to determine a multiplicity of model trajectories for the motor vehicle on the basis of the determined component of the future driving maneuver for the motor vehicle and to determine from the multiplicity of model trajectories a trajectory for the motor vehicle which the motor vehicle is to follow in the further course of its travel. The control system is also configured to update the information relating to the current driving situation of the motor vehicle and/or the supplied surrounding data and to adapt the trajectory for the motor vehicle on the basis of a target function and on the basis of the updated supplied surrounding data and/or on the basis of the updated information relating to the current driving situation of the motor vehicle.

20 Claims, 8 Drawing Sheets

(51) Int. Cl.
*B60W 30/18* (2012.01)
*B60W 50/00* (2006.01)

(52) U.S. Cl.
CPC ....... *B60W 50/00* (2013.01); *B60W 2050/006* (2013.01); *B60W 2552/10* (2020.02); *B60W 2552/53* (2020.02); *B60W 2554/802* (2020.02); *B60W 2554/804* (2020.02)

(56) References Cited

U.S. PATENT DOCUMENTS

| | | | |
|---|---|---|---|
| 2018/0129214 A1* | 5/2018 | Düring | G06V 20/588 |
| 2018/0297606 A1* | 10/2018 | Luo | G01G 19/021 |
| 2018/0339654 A1* | 11/2018 | Kim | G09G 5/37 |
| 2019/0086930 A1* | 3/2019 | Fan | B60W 30/143 |
| 2020/0001863 A1* | 1/2020 | Li | B60W 30/06 |
| 2020/0180618 A1* | 6/2020 | Ohmura | B60W 50/12 |
| 2020/0249683 A1* | 8/2020 | Rosales | G08G 1/166 |
| 2022/0032952 A1* | 2/2022 | Lienke | B60W 60/0011 |
| 2022/0080961 A1* | 3/2022 | Lienke | B60W 30/10 |
| 2022/0234618 A1* | 7/2022 | Kabzan | B60W 50/0097 |

FOREIGN PATENT DOCUMENTS

| | | |
|---|---|---|
| DE | 102013219023 A1 | 3/2015 |
| DE | 102014215244 A1 | 2/2016 |
| DE | 102015208790 A1 | 11/2016 |
| DE | 102015217891 A1 | 3/2017 |
| DE | 102016205442 A1 | 10/2017 |

OTHER PUBLICATIONS

Li Xiaohui et al., "A Sampling-Based Locak Trajectory Planner for Autonomous Driving Along a Reference Path"—2014 IEEE Intelligent Vehicles Symposium Proceedings, IEEE, Jun. 8, 2014 (Jun. 8, 2014), pp. 376-381.

Leinke, Christian et al., "An Ad-Hoc Sampling-Based Planner for On-Road Automated Driving" 2018 21st International Conference on Intelligent Transportation Systems (ITSC), IEEE, Nov. 4, 2018 (Nov. 4, 2018), pp. 2371-2376.

* cited by examiner

CONTROL SYSTEM AND CONTROL METHOD FOR A HYBRID APPROACH FOR DETERMINING A POSSIBLE TRAJECTORY FOR A MOTOR VEHICLE

CROSS-REFERENCE TO RELATED APPLICATIONS

This application is a national stage of International Application No. PCT/EP2019/085300, filed Dec. 16, 2019, the disclosure of which is incorporated herein by reference in its entirety, and which claims priority to German Patent Application No. 102018009927.0, filed Dec. 17, 2018, the disclosure of which is incorporated herein by reference in its entirety.

TECHNICAL FIELD

A control system and a control method for determining a trajectory, which is intended to be followed by a motor vehicle as the best possible reaction to a current driving system, are described here. The control system and the control method may be based on an environmental sensor system in the motor vehicle and assist a driver or an autonomously driving motor vehicle. In the case of autonomous motor vehicles and autonomously controlled motor vehicles, it helps to increase the safety and driving comfort of the occupants of the motor vehicle by using an efficient and robust planning and optimization approach for the trajectory to be determined.

BACKGROUND

The ever more diverse functions of self-driving motor vehicles result in an increased need for reliable and fast control systems and algorithms for planning the movement (trajectory planning) of motor vehicles driving in an at least partially autonomous manner. The increasing number of road users in an ever more complex and dynamically changing vehicle environment is, inter alia, a great challenge. In the architecture of control systems of motor vehicles driving in a partially autonomous or autonomous manner, in addition to detecting and controlling particular traffic situations, the decision-making and movement planning, in particular, greatly influence the overall performance of the corresponding motor vehicle.

Control systems and algorithms which have been increasingly developed in recent years for planning the trajectory of (partially) autonomous motor vehicles testify to the complexity of automated driving. The challenge relating to movement planning generally involves determining a convenient and also collision-free trajectory based on a robust computing model, in which static and dynamic objects in the environment of these motor vehicles are taken into account. It is also desirable to calculate this trajectory as quickly as possible and to optimize it online or to adapt it to the continuously changing vehicle environment in order to thereby ensure real-time performance of the (partially) autonomous systems of the motor vehicles in a dynamically changing environment.

In the past, various approaches to trajectory planning have been developed. These are, for example, movement planning algorithms or techniques for sampling-based trajectory planning. In order to calculate and optimize the trajectory planning, (local) continuous or (global) discrete optimization techniques, for example, are used within the scope of these approaches.

The discrete planning and optimization techniques provide the possibility of appropriate decision-making, but also have the disadvantage that, on account of a multiplicity of calculations to be carried out, there is a large expenditure of time which prevents online or real-time calculations for quickly reacting to a current driving situation.

The local continuous planning and optimization techniques generally provide quickly optimized solutions, but must be initialized in a suitable manner in order to process the combinational tasks which arise in the dynamic vehicle environment.

In modern motor vehicles, driver assistance systems (ADAS—advanced driver assistance systems) provide a multiplicity of monitoring and indication functions in order to make the driving of the motor vehicles safer. In this case, the environment of the motor vehicle is monitored with respect to the course of the journey of the motor vehicle on the basis of environmental data obtained from one or more environmental sensors on the motor vehicle.

Known driver assistance systems determine, for example, whether the motor vehicle is within a lane and whether the driver unintentionally drifts to one side of the lane or is about to leave the lane. These driver assistance systems generate an "image" of the road and, for example, of the lane from the environmental data obtained. In this case, objects are detected and are tracked during driving, for example a curb, lane boundary lines, lane markings, direction arrows, etc. Moving objects such as other motor vehicles are also detected and are tracked during driving (tracking).

Furthermore, so-called "blind spot monitors" are included in modern driving assistance systems. They determine, for example by means of radar, lidar, video or the like, whether another motor vehicle, a road user or an object is to the side of and/or behind the motor vehicle, with the result that a lane change or turning of the subject motor vehicle could result in a collision therewith.

Furthermore, in so-called ACC systems (Adaptive Cruise Control), automatic speed control of the motor vehicle is adapted to the speed of a motor vehicle driving in front. In this case, a particular distance to the motor vehicle driving in front should always be complied with. For this purpose, such systems determine a direction of movement and/or a speed of the motor vehicle driving in front in order to avoid the motor vehicle crossing the path of the motor vehicle driving in front such that a critical situation occurs. This relates, on the one hand, to lane changes or turning operations and, on the other hand, to rear-end collisions.

In motor vehicles controlled by persons, the driver assistance systems usually provide an indication function in order to warn the driver of a critical situation or a corresponding maneuver or to suggest a suitable maneuver for the motor vehicle to the driver. The driver assistance systems may likewise also be used in autonomously controlled motor vehicles in order to provide the autonomous controller with the appropriate environmental data.

In road traffic, situations may occur which require a driver or a (partially) autonomous driver assistance system of a motor vehicle to perform a driving maneuver. For example, a curved lane course may already require a corresponding driving maneuver of the motor vehicle.

However, the current situation of the subject motor vehicle is not constant, but rather changes continuously in reality. Other road users, for example, may perform a lane change or a speed change intentionally or unintentionally as a result of an accident. In addition, the current driving situation of the motor vehicle already changes on account of the driving behavior and/or the changing lane course. Reacting to such changes in the current situation in an appropriate manner and in good time is a great challenge both for conventional driver assistance systems and for human drivers. For this purpose, conventional driver assistance systems calculate, for example, a movement path (trajectory) which is intended to be followed by the motor vehicle in the current driving situation. The complex and dynamically changing traffic situations and the increasingly dense traffic nowadays are reflected in an increasing use of resources by these conventional driver assistance systems. In addition, limits with respect to the execution speed are imposed on the continuous optimization of a calculated trajectory in conventional driver assistance systems.

What is needed, therefore, is to provide a control system and a control method for a motor vehicle which robustly increase the driving safety and driving comfort of the motor vehicle in accordance with a current traffic situation of the motor vehicle. There is also a need to reduce the computing time in comparison with conventional control systems and methods.

SUMMARY

A control system and a control method are disclosed herein for use in a motor vehicle.

One aspect of the disclosure relates to a control system which, for use in a motor vehicle, is configured and intended to detect lanes, road boundaries, road markings and/or further motor vehicles in a region in front of, laterally beside and/or behind the motor vehicle on the basis of environmental data obtained from at least one environmental sensor arranged on the motor vehicle. In one exemplary arrangement, the at least one environmental sensor is configured to provide an electronic controller of the control system with the environmental data representing the region in front of, laterally beside and/or behind the motor vehicle. The control system is at least configured and intended to determine information relating to a current driving situation of the motor vehicle on the basis of the environmental data provided, and to determine at least one component of a future driving maneuver for the motor vehicle on the basis of the information relating to the current driving situation of the motor vehicle. The control system is also at least configured and intended to determine a plurality of model trajectories for the motor vehicle on the basis of the determined component of the future driving maneuver for the motor vehicle, and to determine a trajectory for the motor vehicle from the plurality of model trajectories for the motor vehicle, which trajectory is intended to be followed by the motor vehicle in the further course of its journey. Finally, the control system is at least configured and intended to update the information relating to the current driving situation of the motor vehicle and/or the environmental data provided, and to adapt the trajectory for the motor vehicle using a target function and on the basis of the updated environmental data provided and/or on the basis of the updated information relating to the current driving situation of the motor vehicle.

The component of the future driving maneuver may be a lateral component of the future driving maneuver. It may additionally be a longitudinal component. The component of the future driving maneuver may also comprise a combination of the lateral and longitudinal components.

The lateral component may comprise, for example, lane-keeping, a lane change to the left and/or a lane change to the right, each starting from a lane currently being used by the motor vehicle.

The longitudinal component may comprise, for example, a longitudinal speed and/or a longitudinal acceleration of the motor vehicle. Alternatively or additionally, the longitudinal component may comprise data and/or control signals for one or more electronic control systems of the motor vehicle which are able to carry out or at least initiate adaptive cruise control (ACC) and/or adaptive chassis control (DCC) and/or emergency braking in accordance with corresponding output signals.

The control system may be configured and intended to make a driving maneuver preselection and/or a driving maneuver selection in order to determine the model trajectories and to additionally make the model trajectories on the basis of the driving maneuver preselection and/or the driving maneuver selection.

A beginning of the further course of the journey may temporally indicate the end of the current driving situation.

The adaptation of the trajectory for the motor vehicle using the target function and on the basis of the updated environmental data provided and/or on the basis of the updated information relating to the current driving situation can be carried out continuously or at particular intervals. A new adaptation may in this case require reinitialization of the target function.

The control system may be configured and intended to determine the trajectory from the plurality of model trajectories using a target function which is the same as the target function for adapting the trajectory for the motor vehicle.

The same target function can also be used, for example, when determining the model trajectories.

Comparison options can therefore be provided during the reinitialization of the target function.

The target function may be a cost function, for example.

According to one exemplary arrangement, the information relating to the current driving situation of the motor vehicle comprises at least a lateral distance of the motor vehicle from its currently used lane. In this arrangement, the control system may also be configured and intended to determine the component of the future driving maneuver on the basis of the lateral distance of the motor vehicle from its currently used lane as lane-keeping or as a lane change.

In one exemplary arrangement, the lateral distance may be measured, for example, with respect to the longitudinal axis of the vehicle. The lane change may comprise a lane change to the left and a lane change to the right. The lane-keeping may comprise lane-keeping on the left, lane-keeping in the center and/or lane-keeping on the right.

The information relating to the current driving situation of the motor vehicle may also comprise a lateral distance of one or more further motor vehicles (or their respective longitudinal axes) from their currently used lanes in the environment of the motor vehicle.

According to another exemplary configuration, the information relating to the current driving situation of the motor vehicle can also comprise a longitudinal distance of the motor vehicle along its currently used lane from a further motor vehicle. In these cases, the control system can be configured and intended to determine a further component of the future driving maneuver on the basis of the determined component of the future driving maneuver and on the basis of the longitudinal distance of the motor vehicle from the further motor vehicle.

Alternatively or additionally, the information relating to the current driving situation of the motor vehicle may comprise a relative speed and/or a relative acceleration between the motor vehicle and the further motor vehicle. In this case, the relative acceleration can, but need not, be derived from the relative speed by the control system or a further electronic controller of the motor vehicle.

In one exemplary arrangement, the further component may be the longitudinal component mentioned above, but the present disclosure is not restricted thereto.

The further motor vehicle may be a stationary (parked) or moving motor vehicle.

According to one exemplary arrangement, the control system may also be configured and intended to determine the information relating to the current driving situation of the motor vehicle on the basis of the provided environmental data in the form of discrete sampling values.

In such an exemplary configuration, the control system may also be configured and intended to determine a plurality or all of the discrete sampling values as nodes and/or edges of a graph, and to determine a connected graph from the determined nodes and/or edges. This makes it possible to implement a graph-based method for determining and processing the discrete sampling values.

In this case, the control system may also be configured and intended to select the nodes and/or edges of the graph as stopping points for the trajectory, and to calculate the trajectory for the motor vehicle by means of spline-based interpolation between the selected stopping points.

According to another exemplary arrangement, the control system may also be configured and intended to determine the updated information and/or the updated environmental data in the form of continuous values.

Within the scope of this disclosure, the continuous values may be, for example, quasi-continuous values, wherein a measurement time is assigned to each of the values and the quasi-continuous values are organized according to the measurement time. For reasons of efficiency, the continuous values may consist only of some of the quasi-continuous values, for example every second or every third quasi-continuous value.

In this case, the control system may also be configured and intended to combine the updated information and/or the updated environmental data in the form of continuous values with the information relating to the current driving situation of the motor vehicle in the form of discrete sampling values in order to adapt the trajectory for the motor vehicle.

This above described exemplary arrangement makes it possible to implement a hybrid planning approach for the trajectory, which approach combines discrete and continuous planning and optimization methods and therefore compensates for inherent disadvantages of the individual planning and optimization methods.

In this case, the combination of the information relating to the current driving situation of the motor vehicle in the form of discrete sampling values with the updated information and/or with the updated environmental data in the form of continuous values may at least comprise initializing and/or reinitializing the adaptation of the trajectory for the motor vehicle using the target function.

Alternatively or additionally, the combination of the information relating to the current driving situation of the motor vehicle in the form of discrete sampling values with the updated information and/or with the updated environmental data in the form of continuous values may comprise initializing and/or reinitializing the determination of the continuous values on the basis of the updated information and/or on the basis of the updated environmental data.

A further aspect relates to a control method which, in a motor vehicle, detects lanes, road boundaries, road markings and/or further motor vehicles in a region in front of, laterally beside and/or behind the motor vehicle on the basis of environmental data obtained from at least one environmental sensor arranged on the motor vehicle, wherein the control method is carried out, in particular, by a control system such as that described above. The control method comprises the steps of:

determining information relating to a current driving situation of the motor vehicle on the basis of the environmental data provided, determining at least one component of a future driving maneuver for the motor vehicle on the basis of the information relating to the current driving situation of the motor vehicle, determining a plurality of model trajectories for the motor vehicle on the basis of the determined component of the future driving maneuver for the motor vehicle, determining a trajectory for the motor vehicle from the plurality of model trajectories for the motor vehicle, which trajectory is intended to be followed by the motor vehicle in the further course of its journey, updating the information relating to the current driving situation of the motor vehicle and/or the environmental data provided, and adapting the trajectory for the motor vehicle using a target function and on the basis of the updated environmental data provided and/or on the basis of the updated information relating to the current driving situation of the motor vehicle.

Yet another aspect relates to a motor vehicle comprising a control system described above.

In comparison with conventional driver assistance systems, the solution presented here improves correct assessment and correct detection of the current driving situation of the motor vehicle and of further motor vehicles. In addition, a planning and optimization approach is provided which can be carried out in real time for a trajectory for the motor vehicle and, by combining discrete and continuous planning approaches, makes it possible to robustly and quickly determine the best possible trajectory for a future driving maneuver of the motor vehicle.

This best possible trajectory can therefore be determined as an appropriate reaction to the current traffic situation of the motor vehicle. The environmental data obtained by the at least one environmental sensor change constantly according to the real traffic and driving situation and can be cyclically updated.

If the trajectory for a future driving maneuver of the subject motor vehicle is used, this increases the driving comfort and driving safety of the motor vehicle by virtue of the driving dynamics of the motor vehicle and the dynamically changing environment being taken into account when adapting the trajectory.

Aspects and features described above can be combined as desired in a control system and/or a control method. Although some of the features described above were described with respect to a control system, it is understood that these features can also apply to a control method. The features described above with respect to a control method can likewise apply in a corresponding manner to a control system.

BRIEF DESCRIPTION OF THE DRAWINGS

Further aims, features, advantages and possible uses emerge from the following description of exemplary embodiments, which should not be understood in a restrictive manner, with reference to the associated drawings. In this case, all features described and/or illustrated in the drawing, alone or in any desired combination, show the FIG. 1 schematically shows a motor vehicle having a control system and at least one environmental sensor according to an exemplary configuration.

DETAILED DESCRIPTION

Within the scope of the following disclosure, certain aspects are described primarily with reference to an exemplary arrangement of a control system. However, it is understood that the aspects described in connection with the control system are also valid within the scope of exemplary arrangements of a disclosed control method which can be carried out, for example, by a central control apparatus (ECU) of a motor vehicle. The disclosed control method can be carried out by performing suitable read and write access to a memory assigned to the motor vehicle. The control method can be implemented inside the motor vehicle both using hardware and using software as well as a combination of hardware and software. These elements also include digital signal processors, application-specific integrated circuits, field programmable gate arrays and further suitable switching and computing components.

Figure 1:
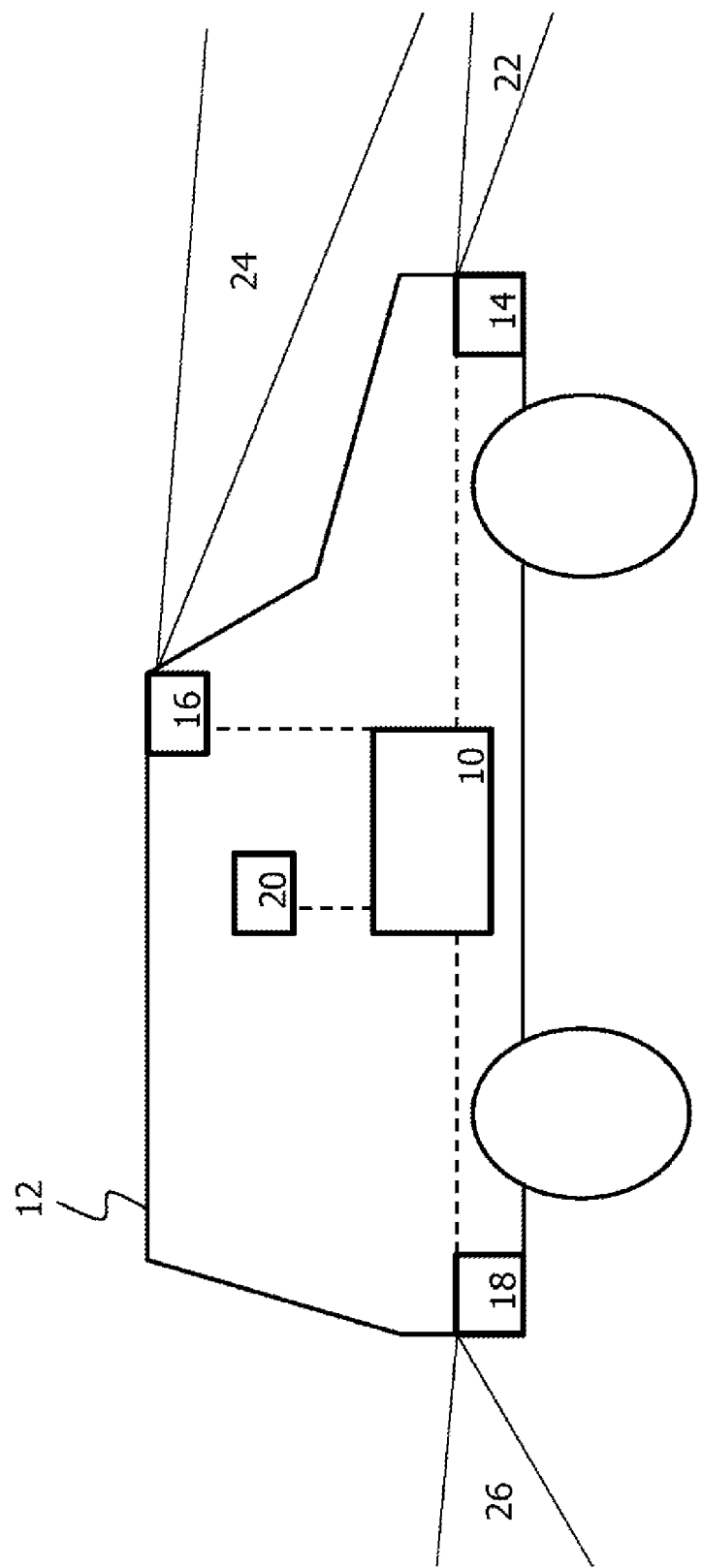

FIG. 1 schematically shows a motor vehicle 12 comprising a control system 10. The control system 10 is coupled to at least one environmental sensor 14, 16, 18 on the motor vehicle 12 in order to receive environmental data from the at least one sensor 14, 16, 18. The control system 10 may comprise an electronic controller ECU (Electronic Control Unit; not illustrated in the figure). For example, the present control system 10, with the aid of the ECU and/or further electronic control systems, can be at least configured and intended to determine a trajectory for the motor vehicle 12, which trajectory is intended to be followed by the motor vehicle 12 in a further course of its journey. For this purpose, the ECU receives signals from the environmental sensors 14, 16, 18, and for example, processes these signals and the associated environmental data and further generates corresponding control and/or output signals.

FIG. 1 illustrates three exemplary environmental sensors 14, 16, 18 which transmit corresponding signals to the control system 10 or the electronic controller ECU. In particular, at least one environmental sensor 14 which faces forward in the direction of travel of the motor vehicle 12 and captures a region 22 in front of the motor vehicle 12 is arranged on the motor vehicle 12. This at least one environmental sensor 14 can be arranged, for example, in the region of a front fender, a front light and/or a front radiator grille of the motor vehicle 12. As a result, the environmental sensor 14 captures a region 22 directly in front of the motor vehicle 12.

At least one additional or alternative environmental sensor 16 which likewise faces forward in the direction of travel of the motor vehicle 12 may be provided. In one exemplary arrangement, environmental sensor 16 is illustrated in the region of a windshield of the motor vehicle 12. For example, this environmental sensor 16 may be arranged between an internal rear-view mirror of the motor vehicle 12 and its windshield. Such an environmental sensor 16 captures a region 24 in front of the motor vehicle 12, wherein, depending on the shape of the motor vehicle 12, a region 24 directly in front of the motor vehicle 12 cannot be captured on account of the front section (or its geometry) of the motor vehicle 12.

Furthermore, at least one environmental sensor 18 may be arranged on the side and/or on the rear of the motor vehicle 12. This optional environmental sensor 18 captures a region 26 which may be to the side of the motor vehicle 12 and/or behind the motor vehicle 12 in the direction of travel of the motor vehicle 12. For example, the data or signals from this at least one environmental sensor 18 can be used to verify information captured by the other environmental sensors 14, 16 and/or to determine a curvature of a lane being used by the motor vehicle 12.

The at least one environmental sensors 14, 16, 18 can be implemented in any desired manner and may comprise a front camera, a rear camera, a side camera, a radar sensor, a lidar sensor, an ultrasonic sensor and/or an inertial sensor. For example, the environmental sensor 14 can be implemented in the form of a front camera, a radar sensor, a lidar sensor or an ultrasonic sensor. A front camera, in particular, is suitable for the higher environmental sensor 16, whereas the environmental sensor 18 arranged in the rear of the motor vehicle 12 can be implemented in the form of a rear camera, a radar sensor, a lidar sensor or an ultrasonic sensor.

The electronic controller ECU processes environmental data obtained from the environmental sensor(s) 14, 16, 18 on the motor vehicle 12 in order to obtain information relating to a static environment (immovable environment objects, for example road boundaries, lane markings, stationary obstacles) and a dynamic environment (movable environment objects, for example other moving motor vehicles or road users) of the motor vehicle 12.

The electronic controller therefore processes the environmental data obtained from the environmental sensor(s) 14, 16, 18 on the motor vehicle 12 in order to capture a lane which is being used by the motor vehicle 12 and has a first and a second lateral lane boundary in front of the motor vehicle 12. The electronic controller ECU additionally processes the environmental data obtained from the environmental sensor(s) 14, 16, 18 on the motor vehicle 12 in order to capture a lane (which is adjacent to the lane being used by the subject vehicle, wherein adjacent means that there may also be one or more further lanes between the adjacent lanes) being used by a further road user, for example another motor vehicle, and its lateral lane boundary is in front of the motor vehicle 12. The other motor vehicle or the further road user may either be stationary or may be moving in or counter to the direction of travel of the motor vehicle 12.

For this purpose, the environmental sensors 14, 16, 18 provide the electronic controller ECU with the environmental data representing the region in front of, laterally beside and/or behind the vehicle. For this purpose, the control system 10 is connected to the at least one environmental sensor 14, 16, 18 via at least one data channel or bus (illustrated using dashed lines in FIG. 1). The data channel or bus can be established by a cable or in a wireless manner.

Alternatively or additionally, the control system 10 or its electronic controller ECU can also receive data from one or more other assistance systems 20 (also called driver assistance system 20 below) or another controller 20 of the motor vehicle 12, which data indicate the lanes being used by the subject motor vehicle 12 and by further road users with the lateral lane boundaries thereof or can be derived therefrom. Data and information already determined by other systems can therefore be used by the control system 10.

Furthermore, the control system 10 or its electronic controller ECU determines a driving situation using the environmental sensors, that is to say on the basis of the environmental data obtained with the aid of the at least one environmental sensor 14, 16, 18. In this case too, an already existing driver assistance system 20 or an electronic controller 20 can alternatively or additionally provide data and/or information which define a driving situation or from which a driving situation can be quickly derived. Depending on the determined driving situation, at least one possible trajectory is then determined, which trajectory is intended to be followed by the motor vehicle 12 in the further course of its journey. This trajectory is adapted substantially in real time to changes in the current driving situation of the motor vehicle 12; in other words, the trajectory is optimized.

The driver assistance system 20 or the electronic controller 20 may also be configured and intended to control the motor vehicle in a (partially) autonomous manner. In this case, the control system 10 is configured and intended to output data for autonomous driving to the driver assistance system 20 or the electronic controller 20. In particular, the control system 10 (or its ECU) can output data, which indicates a course of the determined trajectory and/or of the adapted trajectory which is intended to be followed by the motor vehicle 12 in the further course (which, for example, begins immediately after adaptation or with the end of the current driving situation), to the component 20. The data may likewise be transmitted via a data channel or bus in a wired manner or wirelessly.

Figure 2:
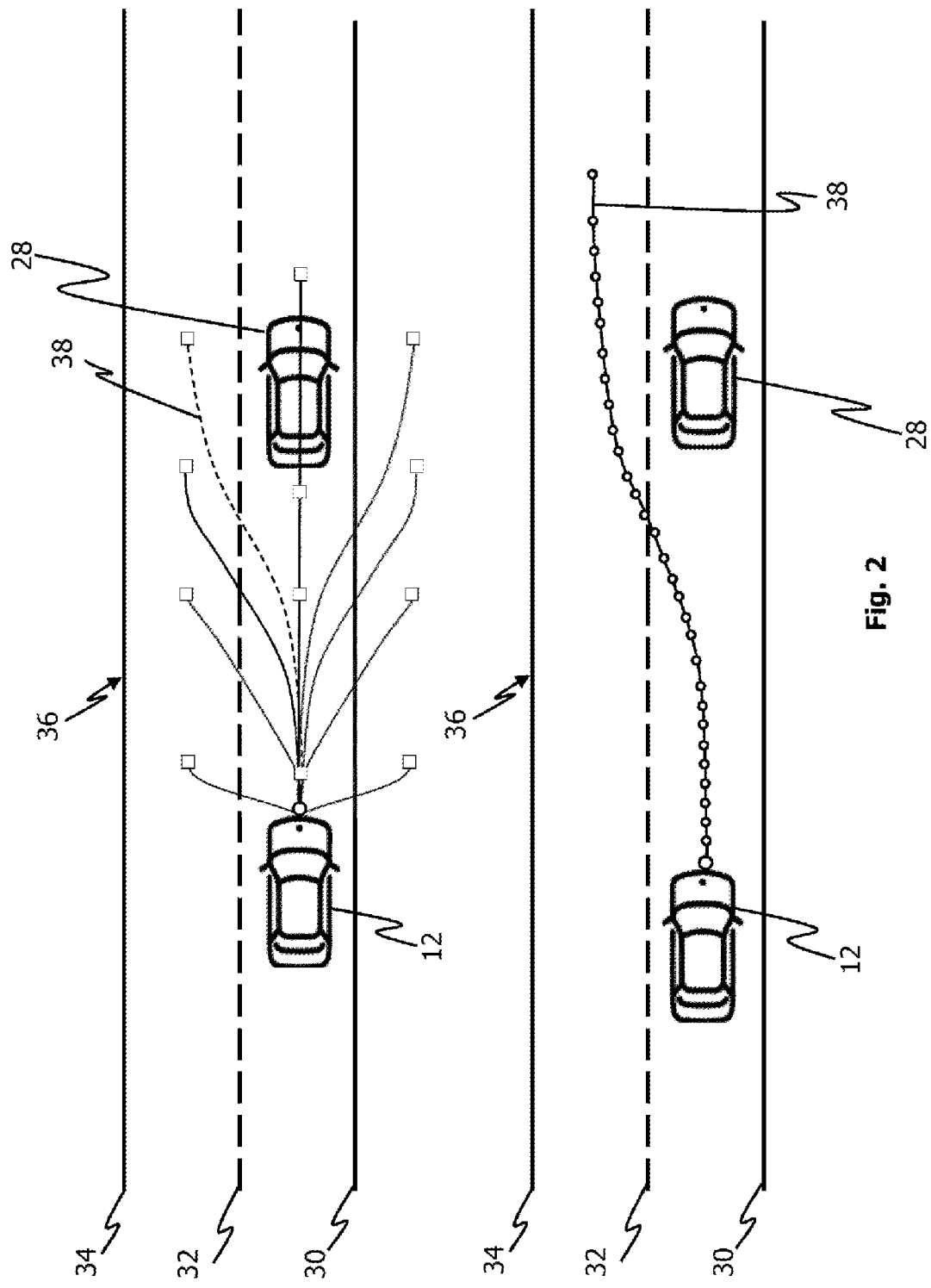
FIG. 2 schematically compares a discrete planning and optimization approach with a continuous planning and optimization approach.

The approach to planning and adapting the trajectory for the motor vehicle 12 in real time, as presented within the scope of this disclosure, is based on a combination of discrete (sampling) values and continuous values (or at least quasi-continuous values) of the environmental data made available to the control system 10. FIG. 2 compares approaches for trajectory planning and optimization on the basis of discrete values (upper illustration) and continuous values (lower illustration), as used in particular exemplary embodiments.

In the upper image in FIG. 2, the motor vehicle 12 is illustrated in a right-hand lane of a two-lane road 36. The right-hand lane is bounded by a right-hand lane marking 30 and by a left-hand lane marking 32. The lane marking 32 simultaneously constitutes the right-hand lane marking of a left-hand lane of the road 36 which is in turn bounded on the left-hand side by a left-hand lane marking 34. The lane marking 32 may but need not be a virtual center line of the road 36. Alternatively, the lane marking 32 may also actually be present on the road 36. At a distance in front of the motor vehicle 12, there is another (further) motor vehicle 28 in the right-hand lane of the road 36. In this example, the other motor vehicle 28 may be stationary or may likewise be moving in the direction of travel of the motor vehicle 12. For example, the motor vehicle 12 may drive behind the other motor vehicle 28 with a distance to be constantly complied with on the basis of speed control (convoy). The driver assistance system 20 can output the appropriate data for this purpose, for example.

For the convoy of the motor vehicle 12 in the upper illustration in FIG. 2, the control system 10 of the motor vehicle 12 uses the at least one environmental sensor(s) 14, 16, 18 to capture the other motor vehicle 28 and determines journey-related information relating to the other motor vehicle 28. Within the scope of this disclosure, this journey-related information relating to the other motor vehicle 28 may be included in information relating to a current driving situation of the motor vehicle 12. The information relating to the current driving situation of the motor vehicle 12 also comprises, for example, a current speed and/or a current acceleration and/or a current jolt of the motor vehicle 12, which are made available in a suitable manner to the control system 10 by further control systems or the ECU of the motor vehicle 12. The current speed may be a lateral and/or longitudinal speed. The current acceleration may also be a lateral and/or longitudinal acceleration. Finally, the jolt may also be a lateral and/or a longitudinal jolt.

Furthermore, the information relating to the current driving situation of the motor vehicle 12 may comprise a distance between the motor vehicle 12 and the motor vehicle 28 and/or a relative speed between the motor vehicle 12 and the motor vehicle 28 and/or a relative acceleration between the motor vehicle 12 and the motor vehicle 28. The distance, the relative speed and the relative acceleration may in turn be lateral and/or longitudinal distances, relative speeds and/or relative accelerations. In order to determine foregoing, the control system 10 can determine lateral and longitudinal distances to the other motor vehicle 28 and lateral and longitudinal speeds and accelerations of the other motor vehicle 28, for example on the basis of the environmental data provided by the at least one environmental sensor(s) 14, 16, 18, and can relate them to the lateral and longitudinal speeds of the motor vehicle 12.

In the upper image in FIG. 2, discrete values (indicated by small squares) are determined by the control system 10 from the environmental data provided by the at least one environmental sensor(s) 14, 16, 18. The control system 10 uses these discrete values (also called sampling values below) to determine the trajectories shown in the upper illustration in FIG. 2 (the curves which each start at the front of the motor vehicle 12 and either follow the current course of the lane or indicate a lane change to the left or right) and selects the best possible trajectory 38 from these trajectories. A discrete (sampling-based) planning and optimization approach is therefore involved in this case.

In this case, the selection is made, for example, using a target function, inter alia on the basis of specifications for the driving comfort and safety of the driver of the motor vehicle 12. In the example in the upper illustration of FIG. 2, the trajectory 38 is selected, in which the other motor vehicle 28 has a lower speed than the motor vehicle 12 in the current driving situation, for example, and must therefore be overtaken. Since there is no further lane of the road 36 to the right of the lane marking, the motor vehicle 12 must pull out to the left-hand lane of the road 36 for overtaking. So that this takes place in a comfortable manner for the driver of the motor vehicle 12 and a collision is avoided at the same time, the trajectory 38 is selected here; this does not require any jerky driving maneuver (the lane change to the left) and leaves a sufficient safety distance to the motor vehicle 28 driving in front during overtaking, which at least minimizes the risk of a rear-end collision.

For high dimensions of the state space, finding the best possible solution in the current driving situation may result in inefficiently high computing times of the control systems used for this. Therefore, it may be necessary to find a compromise between finding the (globally) best possible solution in the current driving situation of the motor vehicle 12 and the computing time used for this purpose, since an increasing number of discrete sampling values and an increasing number of model trajectories to be determined and finally the selection of the best possible trajectory from these model trajectories increase the necessary computing time. On the other hand, there is the risk of too few resources being available in conventional control systems to actually process such a volume of data or at least to process it efficiently. Furthermore, the consideration of the dynamic vehicle environment and the inclusion of a temporal component can increase the computing complexity and therefore the computing time.

In order to obtain faster solutions in this respect, continuous planning or optimization approaches can be used, for example. A diagram of such an approach is shown in the lower illustration in FIG. 2. In this case, in the present example, the trajectory 38 determined with reference to the upper illustration in FIG. 2 is optimized or adapted. The trajectory 38 is therefore improved further in the lower illustration in FIG. 2 on the basis of the desired driving comfort and the necessary driving safety for the current driving situation. In this case, each of the small dots on the trajectory 38 represents a (quasi-)continuous value of this trajectory 28 and can be adapted by the control system 10 after selecting the trajectory 38 in a lateral (normal to the road 36) and/or longitudinal (along the road 36) direction in such a manner that an even smoother and safer operation of overtaking the further motor vehicle 28 can be implemented by the motor vehicle 12. The last quasi-continuous value coincides in this example with the small square from the upper illustration of FIG. 2 which indicates the end of the trajectory 38. The white dots with a black surround in the upper and lower illustrations in FIG. 2 each indicate the starting point (directly at the front of the motor vehicle 12) for the trajectory to be determined and adapted in the lateral and longitudinal directions on the road 36. If continuous planning and optimization approaches are used, no information is lost on account of discretization, but these are generally local planning and optimization approaches which require suitable initialization and consequently also suitable reinitialization. For example, the starting point mentioned above with reference to the lower illustration in FIG. 2 can represent an initialization or reinitialization point of the continuous planning and optimization approach. In addition, these approaches converge toward local minima in the region of the initialization and/or reinitialization point. Insufficient, inadequately robust initialization or reinitialization can therefore in turn result in increased computing complexity.

Within the scope of the present disclosure, the control system 10 is configured and intended to combine the discrete planning and optimization approach presented above with the continuous planning and optimization approach presented above in order to plan and optimize the trajectory which is intended to be followed by the motor vehicle 12 in the further course of its journey. In other words, the control system 10 uses a hybrid planning and optimization approach in order to determine the best possible trajectory for the future course of the journey of the motor vehicle 12 and to adapt it at least substantially in real time (online) to the current driving situation of the motor vehicle 12. The individual discrete and continuous planning and optimization approaches to be combined are not restricted in this case to the examples described above with reference to FIG. 2. Rather, the control system 10 is configured and intended to combine all suitable discrete planning and optimization approaches with all suitable continuous planning and optimization approaches. These include, inter alia, decision trees or random forests, deterministic discretization methods and/or (continuous) spline-based interpolation by means of cubic polynomials and/or by means of fourth-order or fifth-order or higher-order polynomials, in which case this list should not be understood as being conclusive.

Figure 3:
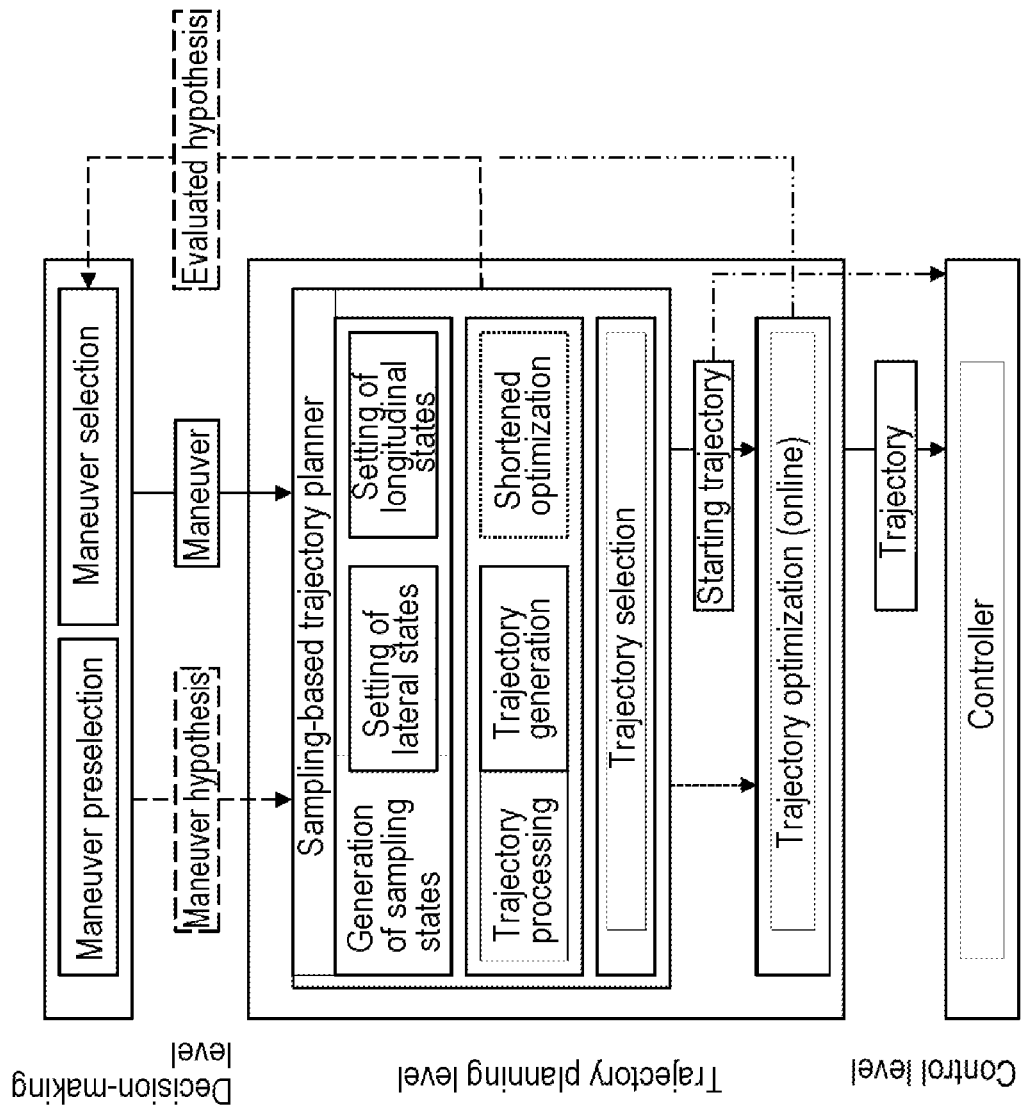
FIG. 3 schematically shows the architecture of a hybrid approach for planning and adapting a trajectory for the motor vehicle according to an exemplary arrangement.

FIG. 3 provides an overview of the approach which is presented within the scope of this disclosure and is based on a combination of continuous values and discrete values of the environmental data made available to the control system 10 in order to plan the trajectory or a plurality of trajectories and to determine the best possible trajectory of the planned trajectories for the further course of the journey of the motor vehicle 12, on which the control system 10 presented here and the control method are based. It becomes clear from FIG. 3 that a maneuver preselection is first made by the control system 10 on a decision-making level. This maneuver preselection can be made, for example, on the basis of the environmental data made available to the control system 10. Within the scope of the description of the architecture of the planning and optimization approach used by the control system 10, reference is additionally made to FIGS. 4 and 5 at a suitable point.

If it emerges, for example when analyzing the current driving situation of the motor vehicle 12 by means of the control system 10, that an overtaking operation must be initiated because another motor vehicle driving in front of the motor vehicle 12 brakes severely, the maneuver preselection may involve a lane change. Generally, at least the maneuvers of a lane change and lane-keeping may be included in a set of basic maneuvers, from which the maneuver preselection is made.

Figure 4:
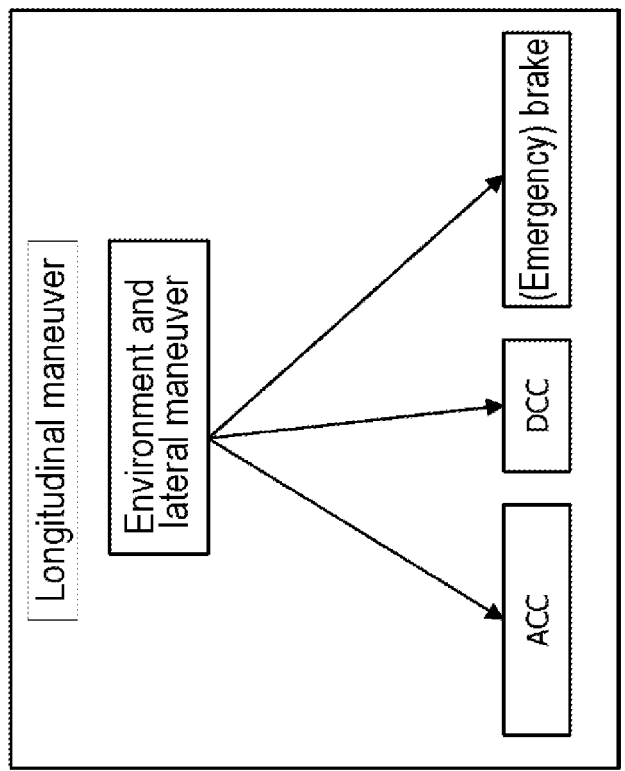
FIG. 4 schematically shows diagrams for determining a lateral maneuver component (on the left) and for determining a longitudinal maneuver component (on the right) according to exemplary arrangements.
Figure 4:
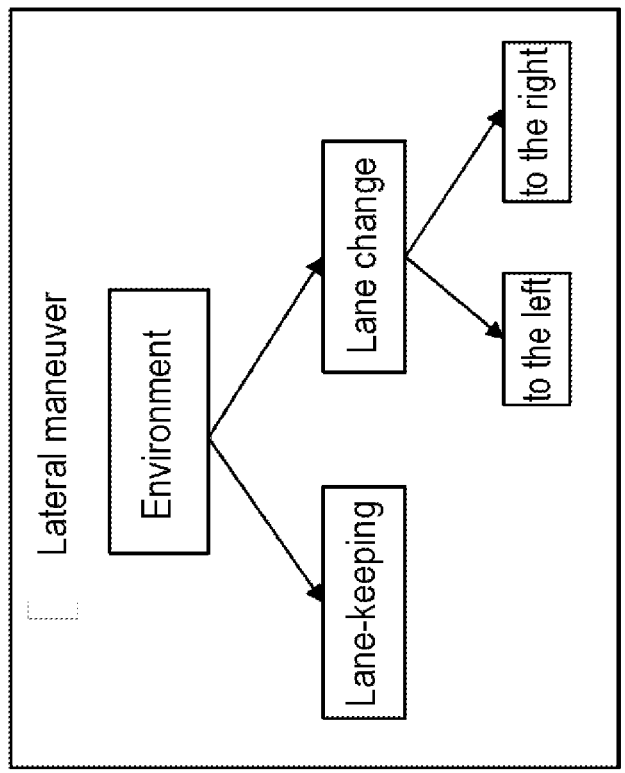

FIG. 4 provides an overview of how the maneuver preselection (this likewise applies to the maneuver selection which is carried out later) can be carried out within the scope of the present disclosure. According to this example, a lateral maneuver (also called a lateral maneuver component) is first of all selected on the basis of the environmental data made available to the control system 10 by the at least one environmental sensor(s) 14, 16, 18. In this case, both the static environment and the dynamic environment of the motor vehicle 12 are considered. Alternatively, only the static vehicle environment or the dynamic vehicle environment can be considered. During the above-mentioned overtaking maneuver of the motor vehicle 12, the decision would provide the lateral maneuver of a lane change here on account of a severely braking other motor vehicle 28 (cf. FIG. 4). Since, on account of the two-lane road 36, only an overtaking operation in which the motor vehicle 12 overtakes the other motor vehicle 28 in the left-hand lane of the road 36 is possible, the lane change to the left is selected by the control system 10 on a lower decision-making level. A further alternative shown in the left-hand illustration of FIG. 4 represents lane-keeping which can be used in a scenario other than that described above, for example during a distance-controlled convoy of the motor vehicle 12 behind the motor vehicle 28. The lane-keeping may also be divided into lane-keeping on the left, lane-keeping in the center and lane-keeping on the right (not shown in FIG. 4) in order to prepare for a subsequent driving maneuver for the motor vehicle 12, for example. However, the present disclosure is not restricted to the above-described lateral maneuver classes. Alternatively, more or fewer or different maneuvers can be defined, from which the maneuver or the maneuver component is preselected. The same can apply to the maneuver selection to be subsequently made.

On the basis of the lateral maneuver component determined, a longitudinal maneuver or a longitudinal maneuver component is then determined in the present example. However, it is understood that the present disclosure is not restricted thereto. For example, the lateral maneuver component and the longitudinal maneuver component can alternatively also be determined independently of one another by the control system 10. In the present case, however, as illustrated in the right-hand illustration of FIG. 4, the lateral maneuver component and again the static and/or dynamic environment are used by the control system 10 to determine the lateral maneuver component. The lateral maneuver component may exist, for example, in the form of a specific absolute or relative distance, speed and/or acceleration specification in conjunction with specific points along the road currently being used by the motor vehicle 12, through which the trajectory to be generated is intended to run. These specifications can then be implemented, for example, by means of the driver assistance system 20 and/or the further electronic controller 20 of the motor vehicle 12. For this purpose, the driver assistance system 20 may denote or comprise an adaptive cruise control assistant and/or an adaptive chassis control assistant and/or an emergency braking assistant.

Referring to FIG. 3, the maneuver preselection or the corresponding data (that is to say data which indicate the selected maneuver) is/are transferred to a trajectory planning level of the control system 10 as a maneuver hypothesis. This data is read or captured there by a planning module (referred to as a sampling-based trajectory planner in FIG. 3). This begins the planning of the trajectories, from which a trajectory is subsequently selected for the further course of the journey of the motor vehicle 12. In other words, the sampling-based trajectory planner implements a discrete planning approach for trajectory candidates (also called model trajectories) described above with reference to the upper illustration in FIG. 2.

The sampling-based trajectory planner first of all generates discrete sampling states which are composed of discrete longitudinal values (in the direction of travel of the motor vehicle 12) and discrete lateral values (transverse to the direction of travel of the motor vehicle 12). In other words, in this planning phase, the sampling-based trajectory planner of the control system 10 sets lateral and longitudinal states which are then used when generating the trajectories. These lateral and longitudinal states may but need not correspond to the lateral and longitudinal maneuver components described with reference to FIG. 4.

The trajectory processing likewise also takes place on the trajectory planning level. Here, the discrete lateral and longitudinal states or the lateral and longitudinal maneuver components or a combination of these lateral and longitudinal states or maneuver components are used, for example, as stopping points of one or more model trajectories which are generated as part of the trajectory generation in FIG. 3. For a stopping point of a model trajectory, the control system 10 can combine, for example, a lateral state and a longitudinal state which each have the same time instance, that is to say, at a particular future time, indicate a point in the lateral and longitudinal directions on the road currently being used by the motor vehicle 12, through which the model trajectory to be generated is intended to run.

Optionally and therefore indicated with a dotted rectangle in FIG. 3, shortened optimization (preoptimization) or adaptation of one or more of the generated model trajectories can already be carried out, prompted by the control system 10. This can be carried out by means of the optimization approach described below or using another suitable optimization approach.

Finally, as part of the trajectory selection shown in FIG. 3, the best possible trajectory for the current driving situation or the future course of the journey of the motor vehicle 12 is selected from the generated model trajectories. In the present example, this selection is made using a target function which can correspond to a cost function. The same target function can also already be used when determining the model trajectories. Since this selection has hitherto been based only on the maneuver hypothesis, all data and/or trajectories generated by the sampling-based trajectory planner are returned to a module on the decision-making level (see the dashed arrow in FIG. 3 which leads to the "maneuver selection").

Target states which relate to the dynamic environment and the static environment of the motor vehicle 12 in the current driving situation as well as the driving comfort and the feasibility of the model trajectories and/or the trajectory selected therefrom are included in the target function, for example. One or more target states may be, for example, a point on the current road (or in an adjacent lane) of the motor vehicle 12 in the lateral and/or longitudinal direction, possibly paired with one or more time instances.

As shown in FIG. 3, all data generated by the sampling-based trajectory planner on the basis of the maneuver hypothesis, that is to say all sampling values and the generated (and possibly preoptimized) model trajectories and data relating to the trajectory selection, are additionally made available to a trajectory optimization module of the control system 10. An optimization in the sense of a trajectory adaptation to a changed driving situation can therefore already be carried out for the trajectory selected on the basis of the maneuver preselection or the maneuver hypothesis.

The optimization and adaptation data obtained as a result in real time are suitably combined with the data provided by the sampling-based trajectory planner and are checked as part of an evaluated maneuver hypothesis. The latter is enabled by including the data obtained during the online trajectory adaptation. The respective data can also be individually made available to a module of the control system 10 for checking the maneuver hypothesis.

On the basis of the evaluated maneuver hypothesis, a maneuver selection is made on the decision-making level, for example by a decision-making module of the control system 10. Here, the same maneuvers as already described above with reference to the maneuver preselection can but need not be available for selection. The selected maneuver and the data corresponding to this maneuver are then in turn supplied to the sampling-based trajectory planner on the planning level. In addition, data obtained as part of the maneuver preselection can be included in the maneuver selection here.

The sampling-based trajectory planner repeats the above-described operations of generating sampling states, including the setting of lateral and longitudinal states and/or lateral and longitudinal maneuver components, and processing the trajectories, including the trajectory selection and possibly the shortened (pre)optimization of the model trajectories and the trajectory selection.

The selected trajectory (called the starting trajectory in FIG. 3) is finally supplied to the trajectory optimization module of the control system 10, still on the trajectory planning level. This trajectory optimization (also called trajectory adaptation within the scope of the present disclosure) is carried out online, that is to say in real time or at least substantially in real time, and can be initialized and/or reinitialized continuously and/or at particular discrete times. The optimized (adapted) trajectory is then made available to an electronic controller of the motor vehicle 12, for example the driver assistance system 20 or the further electronic controller 20, on a control level. This operation of making the trajectory available does not only apply to the adapted trajectory but also to a first determined and therefore ideally preoptimized starting trajectory (see FIG. 3, indicated there by an arrow with a dash-dotted base), with the result that the driver assistance system 20 can already cause the motor vehicle 12 to follow this starting trajectory before the start of or temporally at the start of the adaptation of the starting trajectory, for example.

The data from the trajectory optimization carried out in real time from FIG. 3 are in turn suitably combined with the data provided by the sampling-based trajectory planner and are checked as part of the evaluated maneuver hypothesis. The next planning cycle can therefore begin, in which some or all of the steps described above are carried out again in order to provide the driver assistance system 20 on the control level with the best possible trajectory adapted to the respective driving situation of the motor vehicle 12. In particular, the selected trajectory is adapted again and again in the current driving situation of the motor vehicle 12 in order to be able to react to a change in the current driving situation quickly (substantially in real time) and efficiently. The safety and the driving comfort of the driver and/or of further occupants of the motor vehicle 12 are therefore increased.

This optimization operation is now described again with reference to FIGS. 5 and 6. The flowchart from FIG. 5—which can but need not carry out, in more detail, the trajectory optimization according to the example described with reference to FIG. 3—first of all requires the formulation of an optimization problem. In addition to avoiding a collision with further road users and/or other objects, an important factor in trajectory planning in (partially) autonomous motor vehicles is to ensure that the driving comfort of the occupants of the motor vehicle 12 is high. This is achieved by virtue of the fact that no excessively high (negative or positive) acceleration forces act on the motor vehicle 12 while it is following the trajectory in the course of its future journey. For this reason, the optimization problem is formulated on the basis of the acceleration and/or on the basis of the jolt of the motor vehicle 12 in the respective current driving situation. For this purpose, in the present example, the temporal integral of the jolt starting from the current time instance of the current driving situation of the motor vehicle 12 to a following time instance (which coincides, for example, with a temporal planning aim of the trajectory) is used as part of a target function, for example a cost function. The relative costs of the jolt should be minimized as part of this target function in order to determine the best possible trajectory for the current driving situation of the motor vehicle 12. Furthermore, in addition to the jolt, the deviation of a target state (for example the fact that the motor vehicle 12 is intended to be in the center of the lane beside the currently used lane in the event of a lane change at the end of the trajectory being followed) can be concomitantly included in the discussed target function in the form of additional costs. This deviation can relate not only to lateral deviations but also to longitudinal deviations from the target state. Alternatively and/or additionally, the length of the discussed interval, for which the trajectory is planned, can be concomitantly included in the target function in the form of costs. As a result, the one overall target function can result from a combination of lateral and longitudinal target functions, wherein each of the individual target functions or both can be subjected to weighting. This target function can also already be used when planning the model trajectories and determining the trajectory from the model trajectories in order to ensure that the corresponding results can be compared in the event of necessary reinitialization of the optimization.

Figure 5:
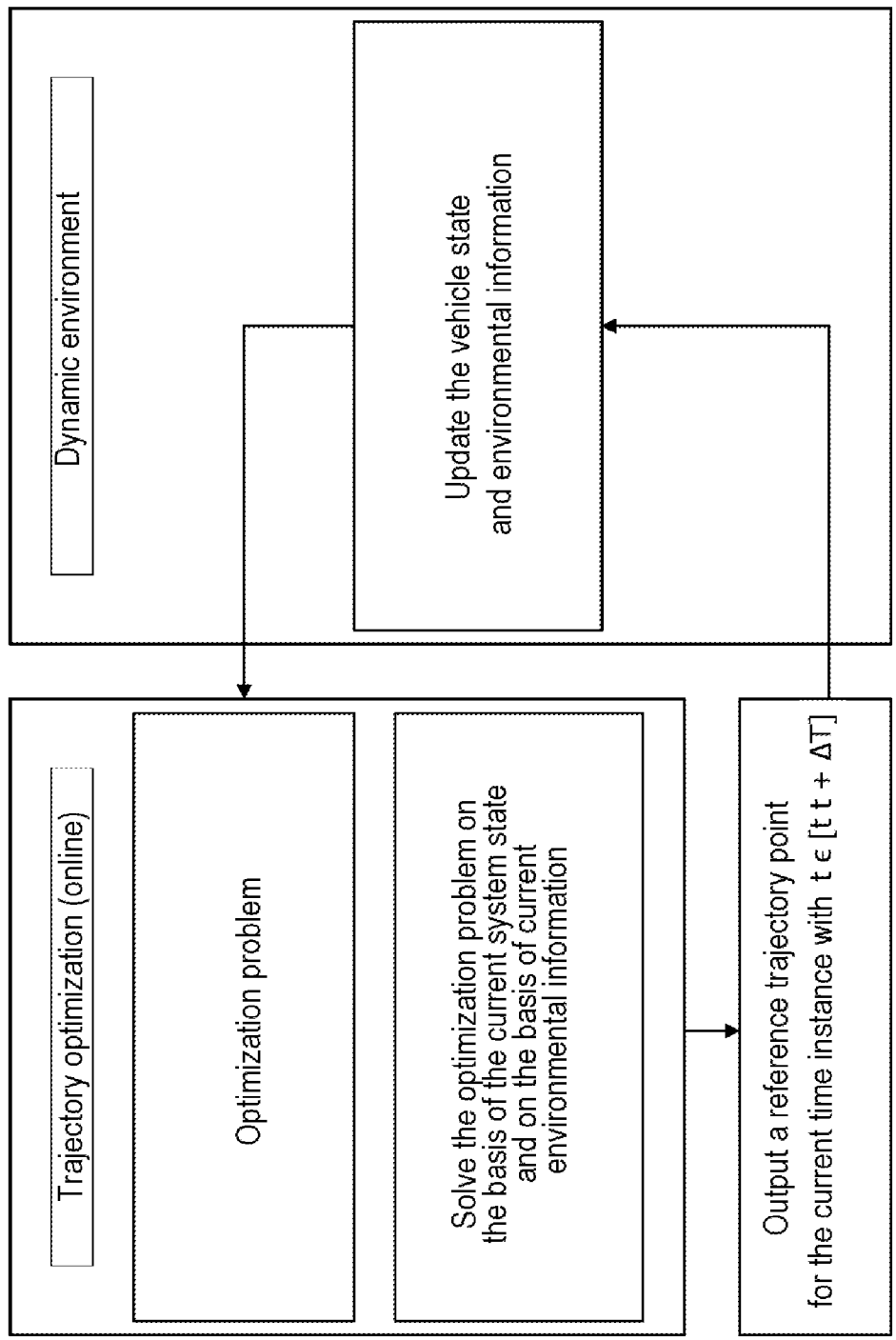
FIG. 5 schematically shows a diagram for adapting the selected trajectory for the motor vehicle according to an exemplary arrangement.

As is clear from FIG. 5, the optimization problem is solved on the basis of the current system state of the motor vehicle and on the basis of the current environmental data made available to the control system 10. The solution to this optimization problem may represent, for example, the trajectory optimization described with reference to FIG. 3. The result of solving the optimization problem provides one or more reference trajectory points for the current time instance or for a current planning period which begins with the current time instance t and lasts until the time instance t+Δt. The control system 10 can create a reference trajectory from the reference trajectory points. This reference trajectory is intended to be complied with if possible by the trajectory which is to be determined and is intended to be followed by the motor vehicle 12 in the further course of its journey. In particular, the control system 10 can determine deviations of individual particular points and/or all points of the trajectory, which is to be determined and is intended to be followed by the motor vehicle 12 in the further course of its journey, from the reference trajectory points. These deviations can then be used when adapting the trajectory for the motor vehicle.

The vehicle state and environmental information relating to the dynamic vehicle environment are then updated, see FIG. 5. For this purpose, the environmental data which are made available to the control system 10 by the at least one environmental sensor(s) 14, 16, 18 and from which information relating to the current driving situation of the motor vehicle 12 is obtained are continuously updated. This may be cyclical, interval-based updating of the environmental data provided or alternatively continuous updating in real time (also called online updating). The updated information relating to the vehicle state (also called system state of the motor vehicle 12) and the environmental information is returned by the control system 10 again and is used for the next optimization problem to be solved. For example, the updated data can be returned to the sampling-based trajectory planner (see FIG. 3) and used there to adapt the determined trajectory and/or to generate new model trajectories. A trajectory for further processing or adaptation can then be selected in turn from model trajectories newly generated in this manner.

On account of the above-described architecture, in interaction with the discrete and continuous planning and optimization approaches presented, the result is a hybrid planning and optimization approach for the trajectory for the motor vehicle 12, which hybrid planning and optimization approach combines these approaches and combines the advantages of the two approaches and compensates for or at least reduces the disadvantages of the two approaches.

Figure 6:
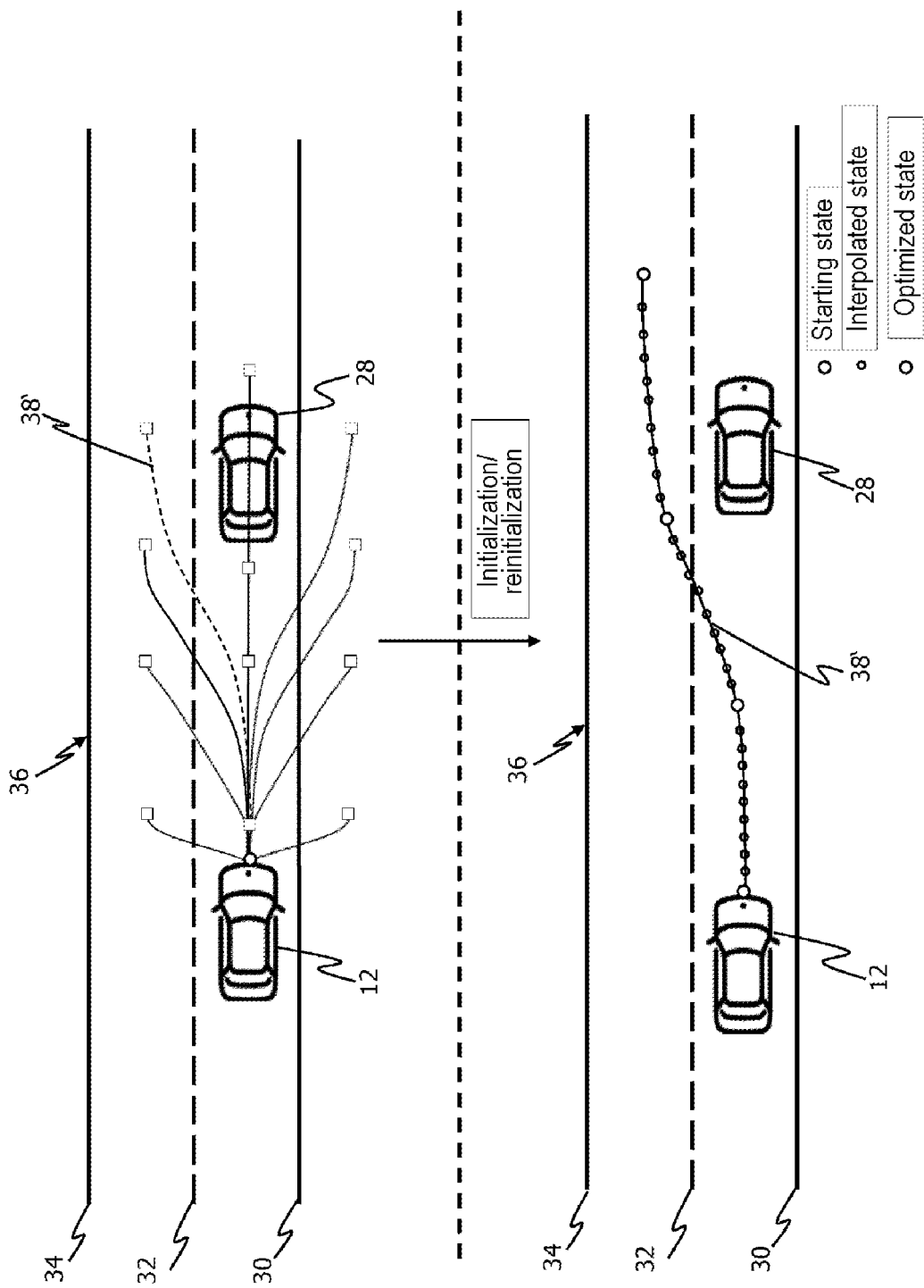
FIG. 6 schematically indicates the relationship of the planning approaches shown in FIG. 2 within the context of a hybrid approach for planning and adapting a trajectory for the motor vehicle according to an exemplary arrangement.

As shown in FIG. 6, the globally best-possible trajectory 38' is first of all determined within the scope of the hybrid planning and optimization approach similar to the discrete approach described with reference to FIG. 2. A continuous planning approach similar to the continuous planning approach described with reference to FIG. 2 is then initialized using this determined trajectory 38' and the associated data which characterize this trajectory 38'. For initialization in each case, the trajectory 38' is then adapted further to the current driving situation of the motor vehicle 12 with the aid of the continuous planning and optimization approach.

If a trajectory other than the trajectory 38' is intended to be adapted to the currently prevailing driving situation with the aid of the continuous optimization approach, there is again a need for initialization, that is to say reinitialization, of the continuous optimization approach on the basis of the data determined for this other trajectory as part of the discrete planning approach. Reinitialization may also be required when a planning and optimization cycle associated with a particular time instance t has ended and the data relating to the system state of the motor vehicle 12 and/or the environmental data have been updated. The reinitialization is then the initialization of the subsequent planning and optimization cycle which begins, for example, at the time t+Δt and takes place in the same manner.

For example, for the initialization and/or reinitialization, starting states and/or end states for the trajectory 38' to be adapted, possibly together with temporal information relating to when these starting states and/or end states are reached, are transferred as data to the planning module for carrying out the continuous planning approach. The starting states and/or end states are generally therefore points in the lateral and longitudinal directions on the road 36 relating to a time instance t (starting state) and t+Δt (end state). Within the scope of the optimization, that is to say the adaptation of the trajectory 38' to the current driving situation of the motor vehicle 12, the control system 10 uses the continuous approach, which is initialized or reinitialized by means of particular data from the discrete approach, to compare, for example, particular (interpolated) points (see the interpolated states in the lower illustration in FIG. 6) of the trajectory 38' with points of the determined reference trajectory (not depicted in the figure), wherein points having the same or temporally successive time instances are compared in each case. If certain deviations result, for example along the road 36 (longitudinal direction or x direction) or transverse to the road 36 (lateral direction or y direction), which are greater than a predefined value for example, these individual points are adapted in the x and/or y direction in such a manner that a maximum predefined deviation with respect to the corresponding point of the reference trajectory is at least complied with or undershot. The adaptation therefore need not mean that a deviating point of the trajectory 38' is replaced with the point of a reference trajectory; it may merely be a local approximation (adaptation) of the deviating point with respect to the corresponding point of the reference trajectory or with respect to another suitable point of the reference trajectory. In this case too, driving-dynamics and therefore comfort-related or safety-related considerations play a role in order to determine a future driving maneuver, which is as smooth as possible and manages, if possible, without high acceleration forces, or the corresponding trajectory, which indicates the temporal and local course of this driving maneuver, for the motor vehicle 12.

A further exemplary driving situation in which the hybrid planning and optimization approach of the present disclosure is used is now described with reference to FIG. 7. The upper illustration again illustrates the motor vehicle 12 in a convoy behind the other motor vehicle 28. A plurality of possible trajectories which could be followed by the motor vehicle 12 in the current driving situation can additionally be seen. The determination of these trajectories may be based, for example, on a spline interpolation of the discrete values obtained by means of the discrete planning and optimization approach.

Figure 7:
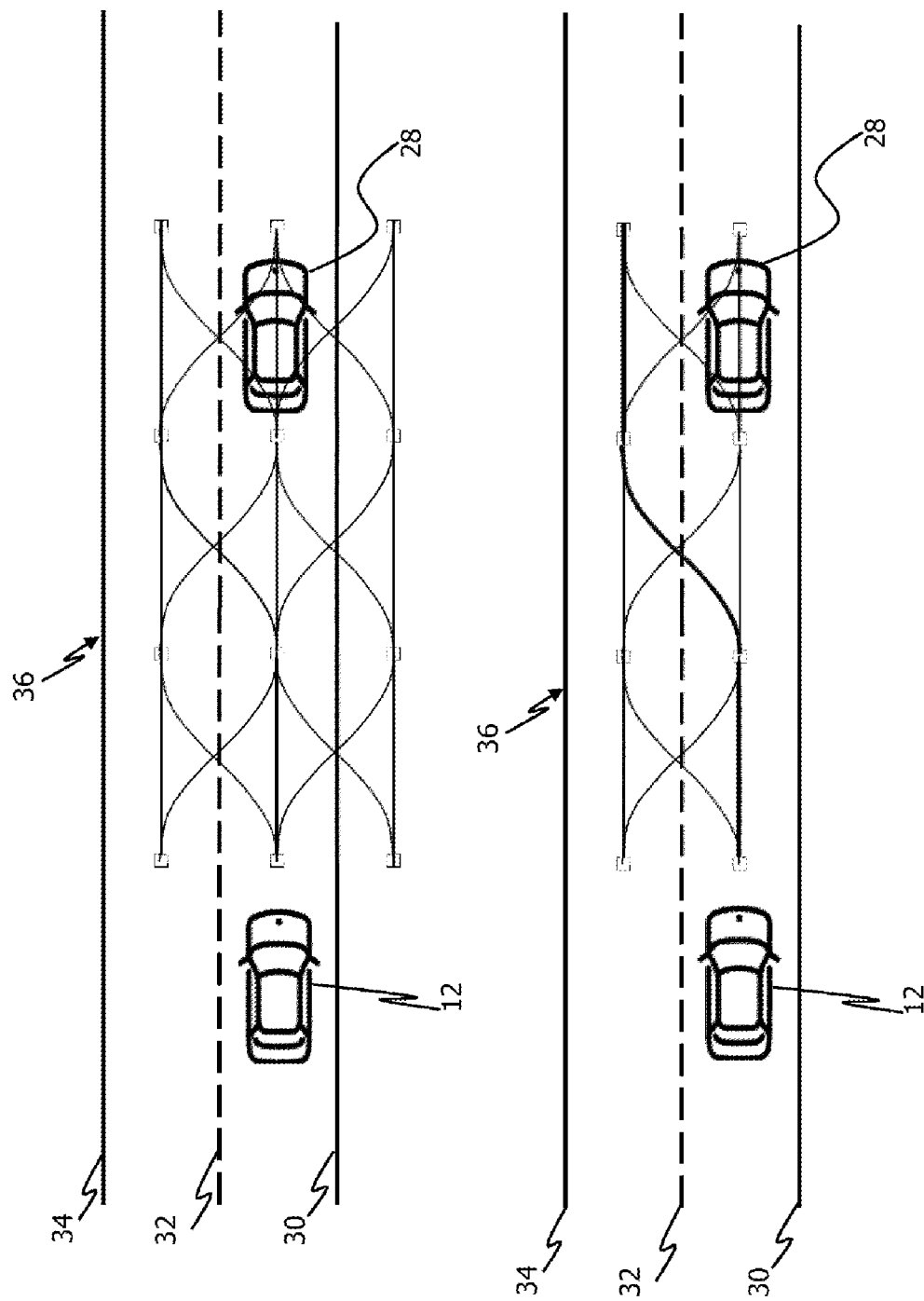
FIG. 7 schematically shows model trajectories and a selected trajectory for the motor vehicle according to an exemplary arrangement.

In the example which is presented here but should not be understood in a restrictive manner, the determination of the trajectories in the upper illustration of FIG. 7 is based on graph-theory considerations. In this respect, nodes and/or edges for a graph are determined from a particular number or from all discrete sampling values by the control system 10 and the (connected) graph itself is finally determined. Some or a plurality or all of these graphs then represent the model trajectories, for example, which are determined by the sampling-based trajectory planner (see FIG. 3, for example) of the control system 10 and from which the best possible trajectory for the future course of the journey of the motor vehicle 12 is determined by the control system 10. The nodes/edges can also represent stopping points for a spline-based interpolation of the graphs or trajectories. A graph-based method is therefore used to determine and process the discrete sampling values.

The scenario taking place in FIG. 7 or the determination and adaptation of the best possible trajectory for the motor vehicle 12 in its current driving situation or starting from its current driving situation is now additionally described with reference to the control method presented in FIG. 8.

Figure 8:
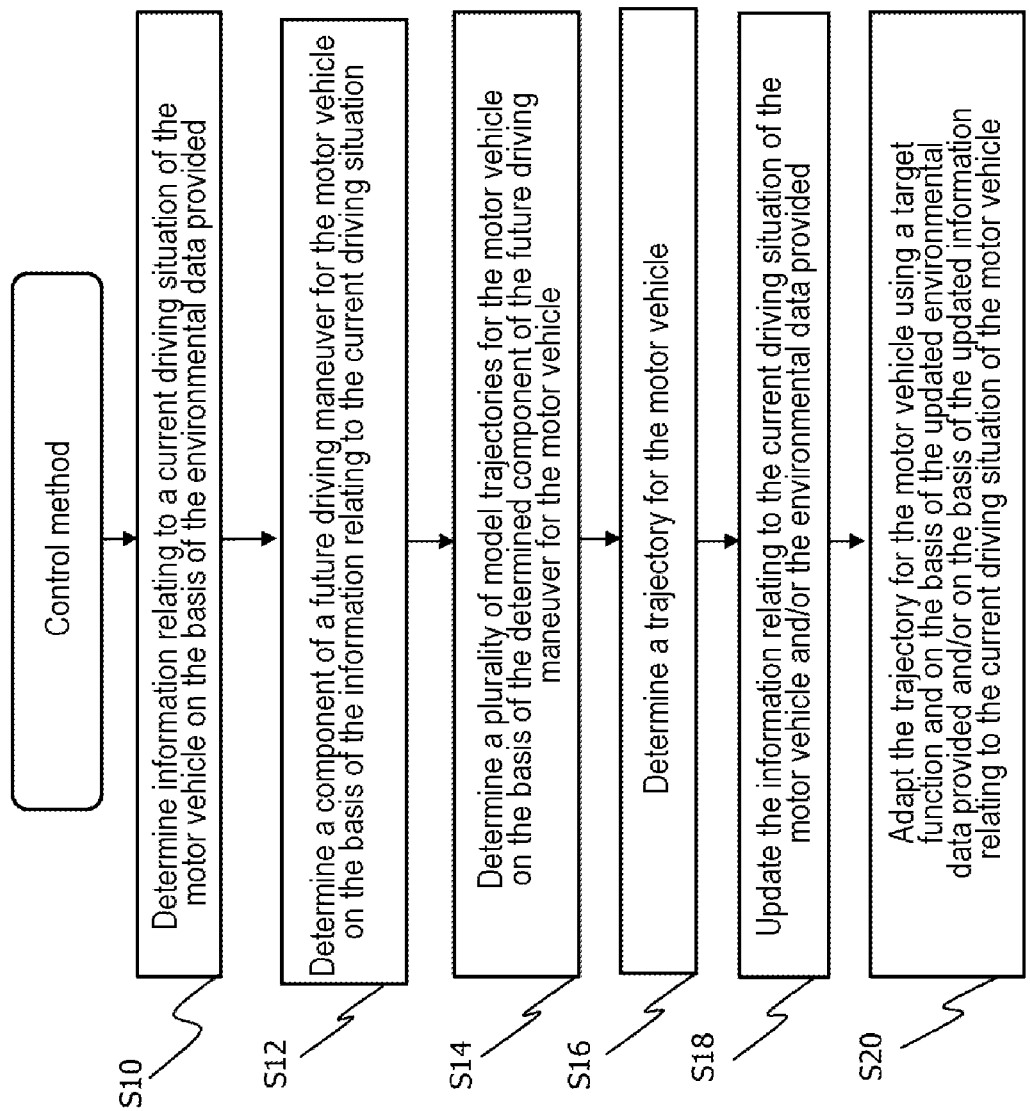
FIG. 8 schematically shows a flowchart of a control method according to particular exemplary embodiments.

FIG. 8 shows a flowchart for a control method which detects lanes, road boundaries, road markings and/or further motor vehicles, for example the other motor vehicle 28 (see FIG. 7), in a region in front of, laterally beside and/or behind the motor vehicle 12 on the basis of environmental data obtained from at least one environmental sensor(s) 14, 16, 18 on the motor vehicle 12. The control method can be carried out, for example, by the above-described control system 10 of the motor vehicle 12. All features described as part of the control system 10 can also be used here for the control method. For example, all above-described features relating to the target function, the component-based determination of future driving maneuvers, the use and combination of discrete and continuous planning and optimization approaches and the initialization and reinitialization can be applied to the control method.

In a first step S10, information relating to the current driving situation of the motor vehicle 12 is determined.

This information may be, inter alia, the lateral distance of the longitudinal axis of the motor vehicle 12 from the left-hand lane marking 32 or the right-hand lane marking 30 and/or the longitudinal distance and/or a relative speed between the motor vehicle 12 and the other (further) motor vehicle 28.

In a second step S12, a component of a future driving maneuver for the motor vehicle 12 is determined on the basis of the information relating to the current driving situation of the motor vehicle 12. If the motor vehicle 12 is approximately in the center of the currently used lane (the right-hand lane of the road 36 from FIG. 7) and the distance between the vehicles 12, 28 is comparatively short (for example in relation to a currently prevailing speed of the motor vehicle 12), for example, the component will involve lane-keeping and/or braking in order to avoid a collision with the motor vehicle 28.

In a third step S14, a plurality of model trajectories for the motor vehicle 12 are determined on the basis of the determined component of the future driving maneuver for the motor vehicle 12. The plurality of determined model trajectories are indicated in the upper illustration in FIG. 7 as a combination of different possible model trajectories. The small squares therefore represent nodes and/or stopping points of a respective partial trajectory which respectively runs between two edges/nodes. In this case, the individual partial trajectories can be combined in any desired manner by the control system 10, thus creating a multiplicity of model trajectories.

In a fourth step S16, a trajectory for the motor vehicle 12 is determined from the plurality of model trajectories, which trajectory is intended to be followed by the motor vehicle 12 in the further course of its journey. In this case, certain model trajectories are excluded, for example, on account of dynamic and static collision checks with regard to movable and immovable objects and/or obstacles in the environment of the motor vehicle 12 that are carried out by the control system 10 on the basis of the environmental data provided, and the best possible trajectory for the motor vehicle 12 is therefore determined. It can be seen in the upper illustration in FIG. 7, for example, that the model trajectories run partially outside the road 36 and are therefore not possible as the trajectory for the further course of the journey. In contrast, the trajectories for an overtaking operation in the left-hand lane of the road 36 and the trajectories for a convoy are still possible trajectories for the motor vehicle 12.

It can finally be seen in the lower illustration in FIG. 7 that the trajectory in bold among the multiplicity of model trajectories is determined by the control system 10 as the trajectory which is intended to be followed by the motor vehicle 12 in the further course of its journey. In the lower illustration of FIG. 7, the control system 10 therefore determines a trajectory, which indicates a lane change to the left, as the best possible trajectory in the current driving situation. Earlier pulling out of the motor vehicle 12 and therefore the operation of following another trajectory would impair the driving comfort of the occupants of the motor vehicle 12 since the motor vehicle 12 would have to accelerate quickly. Excessively late pulling out is also not possible since there could otherwise be a collision with the further motor vehicle 28. Generally, in the situation illustrated by way of example in FIG. 7, the control system 10 selects the lane change to the left or the following of a trajectory for the overtaking operation because the other motor vehicle 28 is either stationary or is moving at a substantially lower speed than the motor vehicle 12. In addition, a lateral distance of the motor vehicle 12 from the lane boundary 32 may be short (in particular shorter than shown in FIG. 7, where the motor vehicle 12 is approximately in the center of its lane), for example, with the result that the motor vehicle 12 has a comparatively shorter pulling-out distance to the overtaking lane when overtaking. The selection of this trajectory may be based, for example, on the above-described target function, like the determination of the model trajectories.

In a fifth step S18, the information relating to the current driving situation of the motor vehicle and/or the environmental data provided is updated.

In a sixth step S20, the trajectory for the motor vehicle 12 is adapted using a target function (for example the target function described above) and on the basis of the updated environmental data provided and/or on the basis of the updated information relating to the current driving situation of the motor vehicle 12. Based on the driving situation from FIG. 7, this means that, if it is assumed that the motor vehicle 12 is intended to carry out a speed-controlled convoy at a constant distance behind the further motor vehicle 28, a trajectory for lane-keeping is first of all selected. This may involve, for instance, combining the four squares in a line in the right-hand lane of the road 36. However, it is determined, when updating the environmental data and/or the information relating to the current driving situation, that there is a possible collision with the other motor vehicle 28 when following this trajectory (indicated at the top of FIG. 7 by the course of the trajectory between the third and fourth black squares through the further motor vehicle 28). The trajectory can then be adapted in such a manner that it corresponds to the movement path in bold from the lower illustration of FIG. 7. In this case, the first part of the planned trajectory (between the first and second black squares in the right-hand lane in FIG. 7) can be retained, in particular, and only the further course of this trajectory can be adapted, with the result that the motor vehicle 12 carries out a lane change to the left and then carries out an operation of overtaking the other motor vehicle 28, for example prompted by the driver assistance system 20.

The planning and optimization approach described above can be used, in particular, within the scope of adapting the trajectory in order to optimize at least the changing part of the trajectory and to find an even more efficient solution for the best possible trajectory which increases the driving comfort and the driving safety of the occupants of the motor vehicle 12 in the current traffic situation.

Within the scope of this disclosure, combining the discrete, for example graph-based, approach for ascertaining and determining the model trajectories or selecting the trajectory for the further course of the journey of the motor vehicle 12 with the continuous approach for optimizing the selected trajectory makes it possible to at least reduce the inherent disadvantages of the two approaches. For example, the number of required discrete sampling values for determining the model trajectories for the sampling-based trajectory planner can be significantly reduced in comparison with the use of a merely discrete planning and optimization approach on account of the subsequent continuous adaptation which is (re)initialized with the results of one or more model trajectories.

As a result of the maneuver preselection on the decision-making level before the beginning of the trajectory planning by the sampling-based trajectory planner, the number of discussed discrete sampling values can also be reduced further.

An efficient (because it can be carried out quickly and saves resources) and robust planning and optimization approach is therefore provided overall for the trajectory which is intended to be followed by the motor vehicle 12 in the further course of its journey.

Exemplary embodiments explained above are not conclusive and do not restrict the subject matter disclosed here. In particular, a person skilled in the art would understand that the features of the various embodiments may be combined with one another and/or various features of the embodiments may be omitted without departing from the subject matter disclosed here.

The invention claimed is:

1. A control system for a motor vehicle configured to detect one or more of lanes, road boundaries, road markings and further motor vehicles in a region adjacent the motor vehicle based on environmental data and to control driving maneuvers of the motor vehicle in real time, the control system comprising:

an electronic controller; and at least one environmental sensor arranged on the motor vehicle and configured to obtain the environmental data representing the region adjacent the motor vehicle and to provide the obtained environmental data to the electronic controller, wherein the electronic controller determines information relating to a current driving situation of the motor vehicle based on first environmental data provided by the at least one environmental sensor, determines at least one component of a future driving maneuver for the motor vehicle based on the information relating to the current driving situation of the motor vehicle, determines a plurality of model trajectories for the motor vehicle based on the determined component of the future driving maneuver for the motor vehicle at a first sampling rate of the first environmental data, wherein the first sampling rate corresponds to a starting location of the motor vehicle for the future driving maneuver and an ending location of the motor vehicle for the future driving maneuver, selects a trajectory for the motor vehicle from the plurality of model trajectories for the motor vehicle, which trajectory is intended to be followed by the motor vehicle in a further course of travel of the motor vehicle, using a first target function that encodes driving comfort and safety of the motor vehicle, receives second environmental data from the at least one environmental sensor and updates the information relating to the current driving situation of the motor vehicle based on the second environmental data, adapts the selected trajectory for the motor vehicle using a second target function and based on the second environmental data sampled at a second sampling rate higher than the first sampling rate and the updated information relating to the current driving situation of the motor vehicle, wherein the second sampling rate corresponds to a plurality of intermediate locations of the motor vehicle between the starting location of the motor vehicle for the future driving maneuver and the ending location of the motor vehicle for the future driving maneuver, and controls the motor vehicle to perform the future driving maneuver by following the adapted trajectory.

2. The control system as claimed in claim 1, wherein the first target function is the same as the second target function.

3. The control system as claimed in claim 1, wherein the information relating to the current driving situation of the motor vehicle comprises at least a lateral distance of the motor vehicle from a currently used lane, and wherein the electronic controller determines the component of the future driving maneuver based on the lateral distance of the motor vehicle from the currently used lane as a lane-keeping or as a lane change.

4. The control system as claimed in claim 3, wherein the information relating to the current driving situation of the motor vehicle also comprises a longitudinal distance of the motor vehicle along its currently used lane from a further motor vehicle, and wherein the electronic controller determines a further component of the future driving maneuver based on one or more of the determined component of the future driving maneuver and the longitudinal distance of the motor vehicle from the further motor vehicle.

5. The control system as claimed in claim 1, wherein the electronic controller determines the information relating to the current driving situation of the motor vehicle based on the first environmental data in the form of discrete sampling values.

6. The control system as claimed in claim 5, wherein the electronic controller determines a plurality of the discrete sampling values as nodes, and creates a connected graph from the determined nodes.

7. The control system as claimed in claim 6, wherein the electronic controller selects the nodes as stopping points for the trajectory, and calculates the trajectory for the motor vehicle by a spline-based interpolation between the selected stopping points.

8. The control system as claimed in claim 1, wherein the electronic controller determines the updated information relating to the current driving situation of the motor vehicle or the second environmental data in the form of continuous values.

9. The control system of claim 8, wherein the electronic controller combines the updated information relating to the current driving situation of the motor vehicle or the second environmental data in the form of continuous values with the information relating to the current driving situation of the motor vehicle in the form of discrete sampling values in order to adapt the trajectory for the motor vehicle.

10. The control system as claimed in claim 9, wherein the combination of the information relating to the current driving situation of the motor vehicle in the form of discrete sampling values with the updated information relating to the current driving situation of the motor vehicle or the second environmental data in the form of continuous values at least comprises the electronic controller initializing or reinitializing the adaptation of the trajectory for the motor vehicle using the second target function.

11. The control system of claim 1, wherein the at least one environmental sensor comprises a plurality of environmental sensors including a first environmental sensor facing forward in the direction of travel of the motor vehicle, a second environmental sensor facing forward in the direction of travel of the motor vehicle, and a third environmental sensor on one of the side or rear of the motor vehicle.

12. The control system of claim 11, wherein the first environmental sensor is positioned in one of a front fender, front light or a front radiator grille of the motor vehicle.

13. A control method for a motor vehicle that detects one or more of lanes, road boundaries, road markings and further motor vehicles in a region adjacent the motor vehicle based on environmental data obtained from at least one environmental sensor arranged on the motor vehicle and controls driving maneuvers of the motor vehicle in real time, the control method comprising:

determining information relating to a current driving situation of the motor vehicle based on first environmental data provided by the at least one environmental sensor, determining at least one component of a future driving maneuver for the motor vehicle based on the information relating to the current driving situation of the motor vehicle, determining a plurality of model trajectories for the motor vehicle based on the determined component of the future driving maneuver for the motor vehicle at a first sampling rate of the first environmental data, wherein the first sampling rate corresponds to a starting location of the motor vehicle for the future driving maneuver and an ending location of the motor vehicle for the future driving maneuver, selecting a trajectory for the motor vehicle from the plurality of model trajectories for the motor vehicle, which trajectory is intended to be followed by the motor vehicle in a further course of its journey, using a first target function that encodes driving comfort and safety of the motor vehicle, receiving second environmental data from the at least one environmental sensor and updating the information relating to the current driving situation of the motor vehicle based on second the environmental data, adapting the selected trajectory for the motor vehicle using a second target function and based on the second environmental data sampled at a second sampling rate higher than the first sampling rate and the updated information relating to the current driving situation of the motor vehicle , wherein the second sampling rate corresponds to a intermediate locations of the motor vehicle between the starting location of the motor vehicle for the future driving maneuver and the ending location of the motor vehicle for the future driving maneuver, and controlling the motor vehicle to perform the future driving maneuver by following the adapted trajectory.

14. The control method of claim 13, wherein the second environmental data is provided in the form of continuous values.

15. The control method of claim 14, wherein the continuous values are in the form of quasi-continuous values and wherein the method further comprises assigning a measurement of time to each of the values and organizing the quasi-values according to the measurement of time.

16. The control method of claim 13, wherein the information related to the current driving situation of the motor vehicle is collected in the form of discrete sampling values.

17. The control method of claim 16, wherein the discrete sampling values are determined as nodes and the nodes are used to determine a connected graph.

18. The control method of claim 13, wherein determining the information relating to the current driving situation of the motor vehicle further comprises determining the lateral distance of the longitudinal axis of the motor vehicle from a lane marking.

19. The control method of claim 13, wherein determining the information relating to the current driving situation of the motor vehicle further comprises determining one or more of a longitudinal distance and a relative speed between the motor vehicle and a further motor vehicle.

20. The control method of claim 13, wherein the determining the at least one component of the future driving maneuver for the motor vehicle involves lane-keeping and/or braking.

* * * * *